Figures 1, 2:
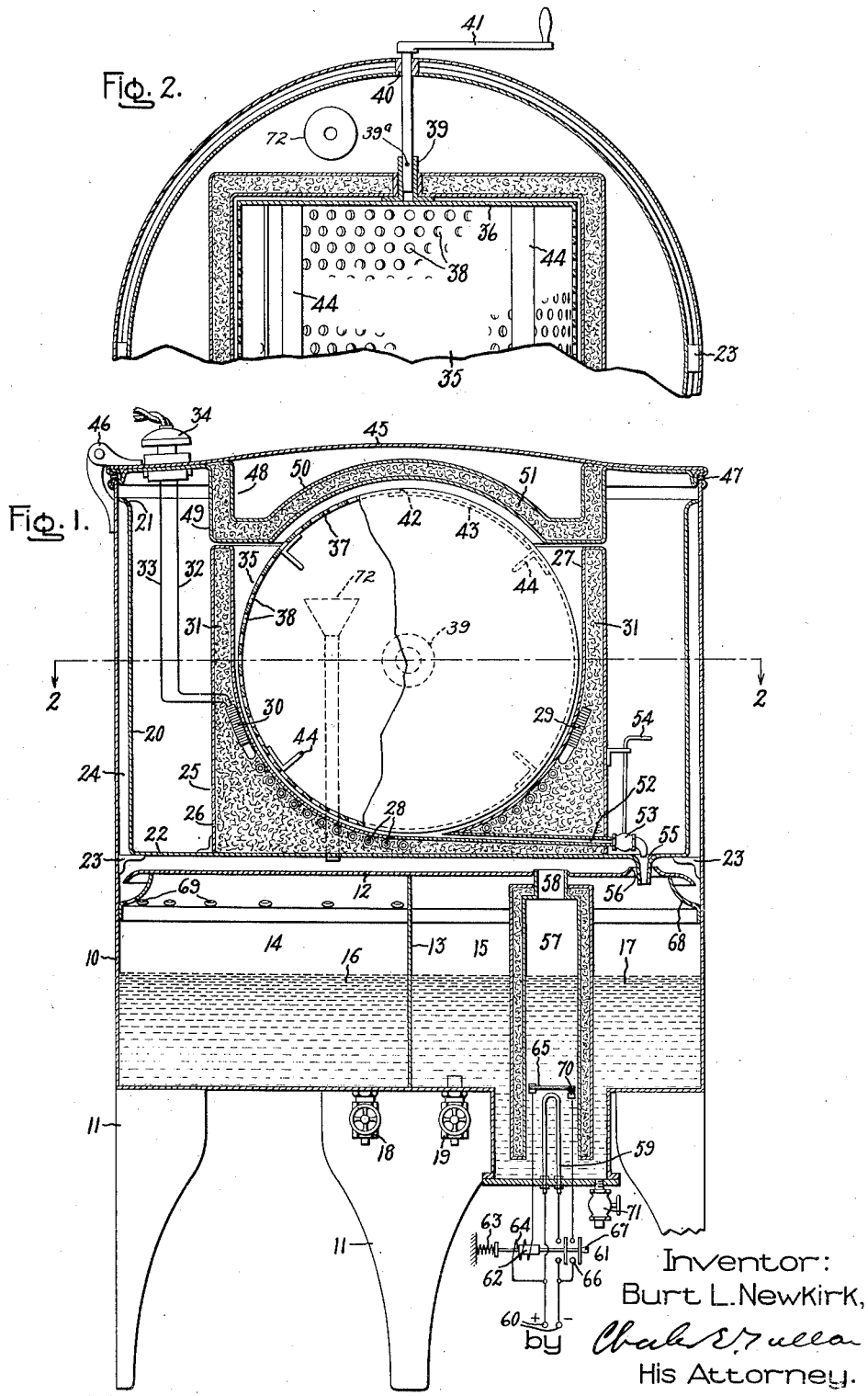

Inventor:
Burt L. Newkirk,
by Chas E. Mulla
His Attorney.

Patented Feb. 20, 1934

1,948,357

UNITED STATES PATENT OFFICE 1,948,357

DRY CLEANING APPARATUS

Burt L. Newkirk, Schenectady, N. Y., assignor to General Electric Company, a corporation of New York Application April 19, 1933. Serial No. 666,865

5 Claims. (Cl. 68—38)

The present invention relates to dry cleaning apparatus for cleaning fabrics. The cleaning, that is, the removing of dirt, particularly oily and greasy substances, from fabric is usually accomplished by an organic solvent such as carbon tetrachloride or a petroleum distillate between gasoline and kerosene.

One object of the present invention is to provide an improved construction and arrangement of a dry cleaning apparatus particularly adapted for domestic use.

Another object of the invention is to provide an arrangement for a dry cleaning apparatus in which the contaminated fluid is reclaimed and distilled for further use.

For a consideration of what I believe to be novel and my invention, attention is directed to the following description and the claims appended thereto, in connection with the accompanying drawing.

In the drawing, Fig. 1 illustrates a sectional view of a dry cleaning apparatus in accordance with my invention, and Fig. 2 is a cross section along lines 2—2 of Fig. 1.

The apparatus comprises an outer casing 10 supported by legs 11. A horizontal partition or wall 12 together with a vertical partition or wall 13 fastened to the interior of the walls of the casing 10 define two tanks or chambers 14 and 15. One of the tanks, in the present instance tank 14, serves for containing clean solvent 16 and the other tank 15, contains contaminated solvent 17. Each of the tanks is provided with a tap 18 and 19 respectively for draining liquid therefrom. The upper portion of the outer casing is provided with a wall 20 concentrically disposed within the outer casing wall 10 and having an upper bent portion 21 engaging the outer casing wall 10 and a bottom 22 supported on angles 23 fastened to the outer casing wall 10. The space 24 defined between walls 10 and 20 forms a condenser space, as will be more fully explained hereafter. Fastened to the bottom 22 is a tumbler casing 25 having an outer wall 26 and an inner wall 27. An electric heating element 28 including thermostats 29 and 30 is disposed within the tumbler casing and the remaining space of this casing is filled with lagging 31. The heating element is connected by lead wires 32 and 33 to a plug 34 which in turn is connected to a suitable source of electric energy (not shown). Disposed within the tumbler casing is a tumbler 35 comprising side walls 36 and a cylindrical body 37 having perforations 38. The side walls are fastened to bearing bushings 39 supported in openings of the tumbler casing. A crank 41 for rotating the tumbler has a bearing support 40 in the outer casing and is fastened to the bushing 39 by means of a pin 39a. The rotatable, perforated cylinder has an opening 42 to receive cloth or like fabric, which opening is closed by means of a sliding cover 43. Baffles, in the present instance shown as angle irons 44, are fastened to the interior of the cylinder for agitating the fabric to be cleaned.

The outer casing is closed by a cover 45 hinged to the casing wall 10 by hinges 46. A gasket 47 is provided between the cover and the casing to prevent escaping of vapor from the tank. Fastened to the inner side of the cover 45 is another cover 48 having a portion concentrically arranged with a portion of the tumbler. The cover 48 for closing the tumbler casing has an inner wall 49 and an outer wall 50 defining a space which is filled with heat-insulating material such as lagging 51. The space defined within the inner wall of the tumbler casing forming the cleaning chamber is connected to a conduit 52 for discharging fluid therefrom. The end portion of the conduit is provided with a valve 53 operated by a handle 54. Fluid discharged through valve 53 flows into the tank 15 through an opening 55 in the bottom 22, which opening is concentrically arranged with an opening 56 in the partition 12. The opening 55 is flanged downwardly to form a short tube projecting into the opening 56 of the partition 12. The flanged portion defines a means for centering the inner casing wall 20 with respect to the outer casing wall 10 and maintaining these parts in their relative positions.

During operation, cloth or the like is put into the tumbler together with a sufficient amount of cleaning liquid. The cloth is then agitated within the liquid by turning the tumbler either in one direction or alternately in one and then in the other direction. The contaminated liquid is removed from the cleaning chamber by opening valve 53 and discharged into the tank 15. The remaining liquid soaked in the fabric is removed by drying the fabric by connecting the heating elements 28 to an electric source. Excessive heating during this drying process is prevented by the thermostats 29 and 30 which automatically disconnect the heating element when the temperature exceeds a predetermined value. The thermostats have not been shown in detail as they do not form a part of my invention. Any kind of thermostat may be used, such as the one disclosed in the specification of Payne Serial No. 520,576, filed March 6, 1931. The vapor escaping from the tumbler during the drying period is condensed in the space defined between the tumbler casing 26 and the inner wall 20. The condensate passes through openings 55 and 56 into the tank 15.

The contaminated fluid which thus collects in chamber 15 is reclaimed according to my invention by distilling it from the chamber 15 into the chamber 14. To this end I provide within chamber 15 a cylindrical member or chamber 57 having double walls with heat insulating material therebetween. The upper end of the member communicates with the space defined between the walls 12 and 22 and the condenser space 24 through a conduit 58. Located within the interior of the member 57 which forms a heating or distilling chamber is a source of heat shown as an electric resistance 59 connected to an electric source of supply 60 through a relay 61. The relay comprises a magnet 62 biased towards open position of the relay by a spring 63. The coil 64 of the magnet is energized from the source 60 through an auxiliary circuit including a thermostat 65 and contacts 66.

To distill contaminated liquid contained in tank 15, the relay 61 is closed by a push button 67, effecting the closing of the auxiliary circuit including the magnet 62 which latter accordingly becomes energized and maintains the auxiliary circuit and the main circuit closed. The heat transmitted from the heating element 59 to the surrounding fluid in the heating chamber 57 effects evaporation of the fluid. The vapor thus produced passes into the condenser space 24 where it is condensed. The condensate flows into a groove or channel 68 which communicates with the clean liquid tank 14 through openings 69.

The chamber 57 provided in tank 15 communicates at its lower end with the liquid outside the chamber. The provision of this chamber has the advantage that only a comparatively small amount of liquid has to be heated during the distilling process. Large surfaces of the condenser effect a rapid condensation of the vapor passed into the condenser space. When the liquid level of the contaminated fluid in tank 15 reaches a certain minimum value, more specifically drops below the level of the thermostat 65, the temperature of the latter increases and thus effects opening of contacts 70 whereby the magnet coil 62 is deenergized and the main circuit as well as the auxiliary circuit are automatically opened. The tank 15 is provided with a tap 71 near the bottom of this tank for draining liquid therefrom and for cleaning the tank. A funnel 72 fastened to the bottom plate 22 is arranged between the outer casing and the tumbler casing for receiving fresh cleaning liquid and conducting it through the opening 69 of the partition 12 into the fresh liquid tank 14.

For disassembling the apparatus the crank 41 is removed after the pin 39a between the crank and the bushing 39 has been taken out. The inner casing wall 20 together with the tumbler casing then can be lifted out of the outer casing.

The apparatus just described which represents a preferred embodiment of my invention is made of sheet metal with tinned inside surfaces and soldered joints and an organic enamel outside finish. This permits the manufacture of such an apparatus at comparatively low cost. An important feature of my invention is that portions of the outer casing and partitions therein define tanks for contaminated liquid and fresh liquid respectively. A heat-insulated member within the contaminated liquid tank defines a heating chamber, and portions of the outer casing walls together with a wall concentrically arranged within the outer casing wall define a condenser for condensing the distilled liquid and discharging it into the fresh liquid tank.

The operation of the apparatus is simple and does not require special skill on the part of the attendant. In the embodiment shown in the drawing the dry cleaning operation is performed manually by turning the crank 41. This permits the provision of simple, inexpensive bearings which do not need special lubrication. The drying of the cleaned fabric is performed by an electric heating element which includes thermostats for automatically opening the electric circuit when the temperature exceeds a certain value. Damage to the apparatus and the fabric is thus prevented. A similar safety arrangement is provided with respect to the heating element in the distilling chamber which includes an auxiliary circuit with a thermostat for automatically opening the main or heating circuit when the liquid level in the distilling chamber drops below a certain value. The cover for the outer tank has a gas-tight fit with the tank by the provision of a proper gasket made of a suitable material for example rubber-like glyptal not attacked by the vapor produced within the tank.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a dry cleaning apparatus, the combination of an outer casing, walls in the casing defining a contaminated liquid tank and a cleansing chamber communicating with said tank, whereby fluid may be discharged from the cleansing chamber into the tank, and means for distilling and condensing liquid contained in the tank including a condenser having an outer wall defined by the outer casing and another wall concentrically arranged with and spaced from the outer casing wall and the cleansing chamber.

2. In a dry cleaning apparatus, the combination of an outer casing, a wall spaced from and concentrically arranged with the outer casing for defining with the latter a condenser, a heat-insulated cleansing casing supported by said wall, partitions provided below the cleansing casing within the outer casing for defining a contaminated liquid tank and a fresh liquid tank communicating with said condenser, means including a valve for conducting liquid from the cleansing casing into the contaminated liquid tank, and means for reclaiming contaminated liquid comprising a source of heat within the contaminated liquid tank and means for condensing liquid and discharging it into the fresh liquid tank, the last named means including said condenser.

3. In a dry cleaning apparatus, the combination of a cleansing casing, a double-walled outer casing surrounding and supporting the cleansing casing and defining a condenser, a tank partly defined by the outer casing for receiving contaminated liquid from the cleansing casing, means for evaporating liquid contained in the tank to reclaim said liquid, means including said condenser for condensing vapor discharged from the contaminated liquid tank, and a fresh liquid tank partly defined by the outer casing for receiving condensate from the condenser.

4. In a dry cleaning apparatus, the combination of a heat-insulated cleansing casing, an outer casing having an upper portion surrounding the cleansing casing and being provided with double walls for defining a condenser, partitions in the lower portion of the outer casing for defining a contaminated liquid tank for receiving liquid from the cleansing casing and a fresh liquid tank for containing liquid reclaimed from the contaminated liquid tank, and means for distilling liquid contained in the contaminated liquid tank and discharging it into the fresh liquid tank comprising a source of heat in the contaminated liquid tank and said condenser for condensing vapor discharged from the contaminated liquid tank and discharging the condensate into the fresh liquid tank.

5. In a dry cleaning apparatus, the combination of an outer casing having an upper double-walled portion defining a condenser, a cleansing chamber provided within the double-walled casing portion, and partitions in the lower casing portion defining contaminated and fresh liquid tanks communicating with the condenser.

BURT L. NEWKIRK.